Feb. 17, 1953     A. B. CHUDYK     2,629,074
PRESSURE CONTROL APPARATUS HAVING LIMITING CONTROLLER
Filed June 12, 1947
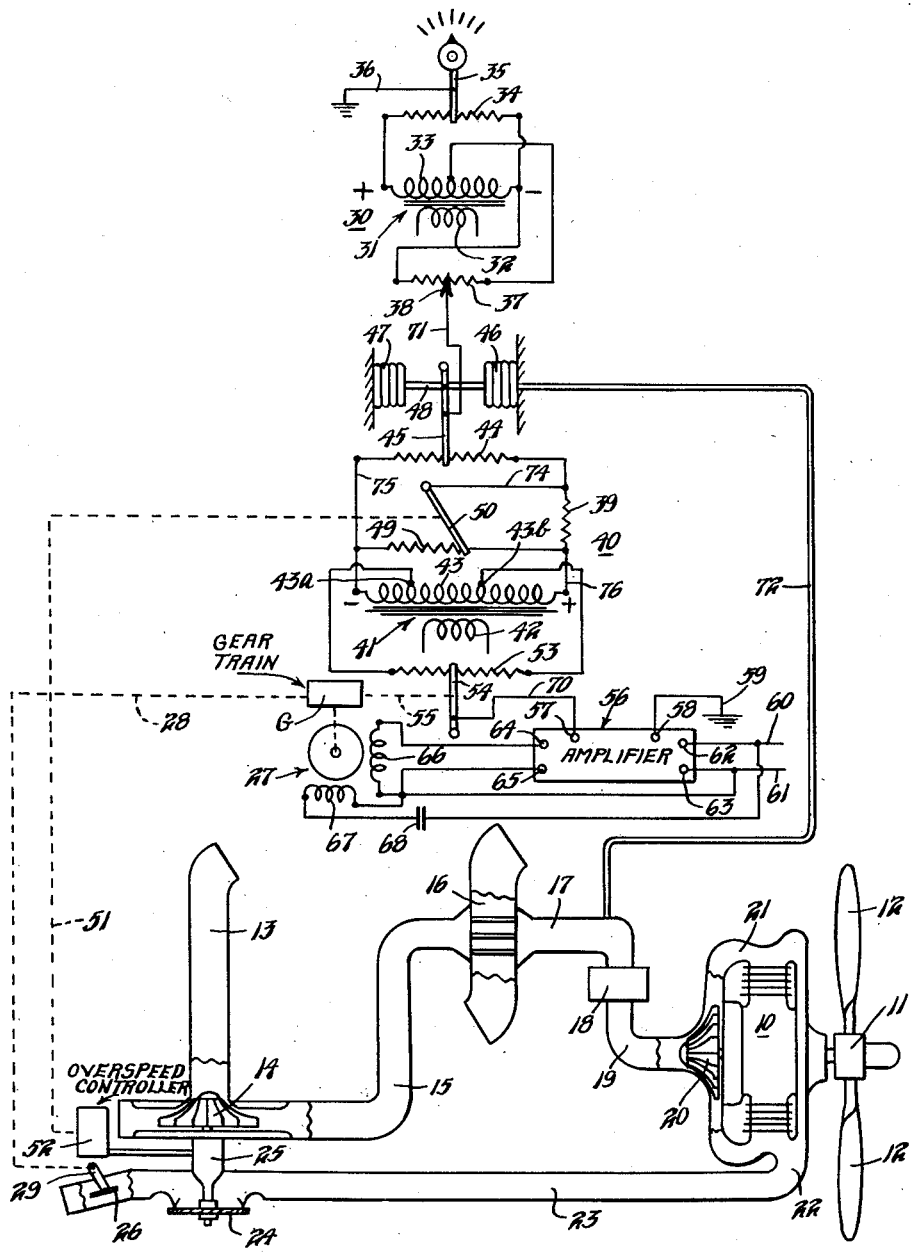
Inventor
ALEX B. CHUDYK
By
George H. Fisher
Attorney Patented Feb. 17, 1953

2,629,074

UNITED STATES PATENT OFFICE 2,629,074

PRESSURE CONTROL APPARATUS HAVING LIMITING CONTROLLER

Alex B. Chudyk, St. Louis Park, Minn., assignor to Minneapolis-Honeywell Regulator Company, Minneapolis, Minn., a corporation of Delaware Application June 12, 1947, Serial No. 754,227

5 Claims. (Cl. 318—28)

The present invention relates to control apparatus and particularly to that type of control apparatus adapted for use in condition control wherein it is necessary to provide for the limiting of a condition.

In present day aircraft of the type adapted for flying at high altitudes, it is customary to employ the exhaust gases from the engine to drive a turbine driven air compressor to maintain high powers from the engine at high altitudes. The volume of air compressed by such a compressor is a function of the speed of the compressor so, therefore, as a plane flies higher the air becomes thinner, it is necessary to increase the speed of the turbine compressor in order to maintain the same power output from the engine.

Controlling the speed of such a compressor is a waste gate which is positioned in the exhaust stack of the engine and which varies the amount of the exhaust gas that will pass through the blades of the turbine driving the compressor. A pressure sensing device, acting through an appropriate network, an amplifier, and a motor, positions the waste gate according to the air pressure desired at some point on the intake system of the engine. From this, it may be seen that as the plane increases in altitude and the air becomes thinner, it is necessary to have a higher rotational speed at the turbine compressor to maintain a desired pressure. Since present day materials are subject to failure at high rotational speeds, it is necessary to provide a limiting device for limiting the speed of the compressor.

Under certain conditions of operation of the apparatus, as at high altitudes, it is possible to have a pressure sensing device calling for more pressure and a speed on the compressor that must be cut down to prevent damage to the same. Prior types of electrical control apparatus have employed limiting devices which have acted in opposition to pressure sensing devices in such a manner that the action of one was bucking the action of the other which resulted in very erratic operation as the overspeed condition started to occur. This erratic operation set up a hunting condition that rendered the control apparatus ineffective.

My invention employs a new method of control wherein the pressure sensitive device is normally in full control of the control apparatus and whereupon the occurrence of an overspeed condition, the pressure sensitive device controlling effect is decreased by an amount proportional to the overspeed condition and the pressure demand is decreased an amount proportional to the overspeed condition.

It is therefore an object of the present invention to provide a pressure sensitive control apparatus wherein the pressure sensitive device is normally in full control of the control apparatus and upon the occurrence of a condition requiring limiting, the controlling effect of the pressure sensitive device is to be decreased by an amount proportional to the magnitude of the condition to be limited.

A further object of the present invention is to provide a pressure sensitive control apparatus wherein a pressure sensitive device normally has full control of the control apparatus and upon the occurrence of a condition to be limited the controlling effect of the pressure sensitive device will be decreased and the pressure demand of the apparatus will be decreased by an amount proportional to the overspeed condition.

A still further object of the present invention is to provide in a condition controlling apparatus, a condition sensing device and a limiting device, the latter of which is operative upon the occurrence of a condition to be limited to decrease the controlling effect of the condition sensing device and shift the controlling effect of the controlling apparatus in a condition limiting direction.

Still another object of the present invention is to provide in combination with the above outlined objects a balanceable bridge network including a plurality of impedances having variable taps one of which is associated with a limiting device, an impedance operable to change the output of the bridge in a condition limiting sense whenever the tap associated with the limiting device opens circuits with its associated impedance.

These and other more detailed and specific objects will be disclosed in the course of the following specification, reference being had to the accompanying drawing on which is a diagrammatical showing of a complete engine, induction and exhaust system with a turbo supercharger, and my invention applied to the control system thereof.

Referring to the single figure, the numeral 10 represents an aircraft engine of the radial type which is connected through a drive shaft to a propeller hub 11 to which are fastened a plurality of propellers 12. Air for the engine 10 is taken in through a conduit 13 and is compressed by a centrifugal compressor 14 which forces the compressed air through a conduit 15, an innercooler 16, and a conduit 17 to a carburetor 18. The air in the carburetor 18 is mixed with appropriate fuel and is fed through a further conduit 19 to a direct driven compressor 20. The compressor 20 forces the air and fuel mixture into the intake manifold 21 of the engine 10. An exhaust manifold 22 carries the exhaust gases from the engine 10 away from the cylinders through a conduit 23 which in turn carries the gases to an exhaust driven gas turbine 24. The exhaust turbine 24 is coupled to the centrifugal compressor 14 through coupling 25. Controlling the amount of exhaust gas that will flow through the turbine 24 is a waste gate valve 26 which is positioned to control the exhaust gases flowing in a by-pass around the turbine. This waste gate 26 is positioned by a waste gate motor 27 by way of a suitable gear train G, a coupling 28, and an actuating arm 29 for the waste gate 26.

Controlling the rotation of the waste gate motor is a complex electrical network consisting of two main sections, 30 and 40, connected to form a balanceable network. The output of the network is fed through an amplifier 56 which in turn controls the energization of the waste gate motor 27, as will be explained hereinafter. The amplifier 56 is the type of amplifier adapted to amplify alternating current of a frequency corresponding to the frequency of the power source. The phase of the output voltage of the amplified signal is determined by the phase of the signal voltage on the input terminals.

The network 30 consists of a power transformer 31 having a primary winding 32 and a secondary winding 33. Connected across the opposite terminals of the secondary 33 is a slide wire resistor 34. The slider 35, which is grounded at 36, is the manual adjustment for the control network. Connected to the right half of the secondary 33 is a further slide wire resistor 37 having an associated slider 38. The slide wire resistor 37 and slider 38 are calibrating means for the control network.

The network 40 consists of a transformer 41 having a primary winding 42 and a secondary winding 43. Connected across the opposite terminals the secondary winding 43 is a slide wire resistor 44 and an associated slider or variable tap 45. The slider 45 is positioned by a pressure sensitive device consisting of bellows 46 and 47 and an associated actuating stem 48. Also connected to the opposite terminals of secondary winding 43 is a slide wire resistor 49 and an associated wiper or variable tap 50. The slider or tap 50 is normally biased to the position shown by means not shown, and is coupled to the overspeed controller of the turbine supercharger by means of coupling 51. A resistor 39 is connected between the slider 50 and one end of the slide wire 49 and actually is a safety resistor whose function will be fully explained in the operation of the control apparatus.

Also connected to the secondary 43 at taps 43a and 43b is the follow up or rebalancing slide wire resistor 53 having an associated slider 54 connected to the waste gate motor 27 through the gear train and the coupling 55. The taps 43a and 43b are so spaced that the movement of slider 54 on slide wire 53 will be proportional to the desired movement required to correctly position the waste gate 26 and regain balance in the control network. In one particular installation, where the voltage on the secondary 43 was 30 volts, the taps 43a and 43b were spaced 12 volts apart and the tap 43a was positioned 6 volts from the left hand terminal of the secondary winding.

The amplifier 56 comprises input terminals 57 and 58, the latter of which is grounded at 59. A pair of input power lines 60 and 61 supply power to the input terminals of the amplifier 56 at 62 and 63. The output of the amplifier is taken from terminals 64 and 65 and is fed to the control winding 66 of the waste gate motor 27. A further motor energizing winding 67, is connected to the input power lines 60 and 61 through a condenser 68 which serves to shift the power supplied to the winding 67 in an amount which will make the windings 66 and 67 phased 90 electrical degrees apart so that the rotor 69 will rotate when both windings are energized.

It will be evident that if the motor field winding 66 is supplied with alternating current which leads the current of the other field winding 67 by 90 electrical degrees the motor will rotate in one direction, and if the current in winding 66 lags the current in winding 67 by this amount, the motor will rotate in the opposite direction.

*Operation*

In considering the operation of the present invention it will be assumed that the transformer primary windings 32 and 42 are connected to a common alternating current input as to the input power lines 60 and 61. From this it may be seen that the phase of the signal on the input terminals 57 and 58 of the amplifier 56 will be determined by the electrical phase balance of the networks 30 and 40. The electrical networks 30 and 40 are joined by a conductor 71 connected between the slider 45 and the slider 38 to form a series network whose output terminals are at ground 36 and slider 54. The output terminal 54 is connected to input terminal 57 of amplifier 56 by way of conductor 70, and the ground terminal 36 is connected to terminal 58 by way of ground 59. From this it may be seen that the amplifier 56 will be sensitive to the unbalance voltages present across the networks 30 and 40. In other words, the voltage on the input terminals of the amplifier will be the algebraic sum of the voltages appearing across the electrical networks 30 and 40.

Assume for one particular half cycle that the polarities of the secondary windings 33 and 43 are as shown on the diagram so that the left hand terminal of the secondary 33 is positive with respect to its right hand end and the left hand end of the secondary 43 is negative with respect to its right hand end. With the manual control slider 35 in the position shown on the drawing, which is the approximate center position, and the calibration slider in the position as shown, it can be seen that the algebraic voltage existing between the slider 35 and the slider 38 will be slightly negative by an amount which will be equal to the amount of negative signal determined by the calibration slider 38.

In the network 40, it will be assumed that the sliders or taps 45, 50, and 54 are in the positions shown. With the slider 45 in the center position, the voltage added will be zero. The slider 50 will have no effect upon the circuit voltage since it is acting merely as a short circuit about the resistor 39. The slider 54 is right of center so that the voltage due to its position is slightly positive. Since the voltage across the output terminals of the bridge is the algebraic sum of the voltages across the networks 30 and 40, it can be seen that when the slightly negative voltage of the network 30 is addde to the slightly positive voltage of the network 40 the sum will be equal to zero. With a balance voltage of zero voltage on the terminals 57 and 58 of the amplifier 56, there will be no signal on the output terminals 64 and 65 to energize the winding 66. When the winding 66 is deenergized, there can be no rotation of the rotor 69 and the control apparatus will be considered to be in a balanced condition.

Assume now that there has been a change in the carburetor intake pressure which is transferred through the pressure sensing line 72 to the bellows 46. The change in the pressure on the bellows 46 will cause a movement upon the slider 45 in a direction dependent upon the change in direction of the pressure in the carburetor. Assume that the pressure change has been in such a direction as to move the slider 45 to the left. The movement of this slider to the left will cause a negative signal, assuming the transformers are phased as shown, to be developed across the network 40. This negatively phased alternating current signal will be sent across the input terminals 57 and 58 of the amplifier and the motor 27 will be caused to rotate in such a direction as to move the slider 54 in the opposite direction to counterbalance the negative voltage introduced by the movement of the slider 45. It will be obvious that the movement of the slider 54 will have to be in a positive direction by an amount that will be equal to the unbalance existing across the bridge network. Since the slider 54 is moved by the waste gate motor 27 to the balancing position, the waste gate 26 will be moved at the same time in a direction to change the speed of the gas driven turbine in a pressure maintaining sense.

Movement of the manual pressure controller 35 has a control effect upon the electrical network and such movement will initiate an unbalance condition across the network which will cause a rotation of the waste gate motor and the repositioning of the waste gate 26 to change the speed of the turbine 24 by an amount proportional to the movement of the manual controller to thus change the pressure in the system. With the movement of the manual controller, the unbalance will be compensated by a proportional movement of the pressure sensitive slider 45 and the follow up slider 54.

As yet no consideration has been given to the slider 50 which is associated with the overspeed controller of the control network. Under normal operating conditions, the slider 50 is biased to the right hand terminal so that it has no effect upon the balance of the electrical network. When a plane is flying at very high altitudes, it is possible to have a condition where the pressure sensitive device is calling for an increased pressure and is unbalancing the electrical network in a direction to cause a closing of the waste gate 26 to increase the speed of the turbine 24 so that there will be more air compressed. With such an increase in speed the maximum safe velocity of the turbine may have been reached and it is necessary to cause a limiting signal to be introduced into the control network which will cause opening of the waste gate 26 to thereby maintain the speed of the turbine 24 at a safe value.

Heretofore, systems of this nature have been provided with a limiting apparatus that introduce a signal opposite to that called for by the pressure sensitive device. Such systems as this are apt to set up hunting conditions in the control network as the pressure sensitive device is operating in opposition to the limiting device. The present invention is so designed to eliminate these adverse conditions that were present in the prior system. This is accomplished in the present invention by energizing the slide wire 44 associated with the pressure sensitive device through the pressure limiting slide wire 49 and the associated slider 50. The energizing circuit for this slide wire resistor 44 may be traced from the positive terminal of the secondary 43, through the conductor 76, slider 50, biased as shown, conductor 74, slide wire 44, and conductor 75 back to the secondary 43.

From the above traced circuit it can be seen that the voltage upon the slide wire 44 is dependent upon the amount of voltage that exists between the slider 50 and the conductor 75 and that when slider 50 is biased in the right hand position in the absence of an overspeed condition, the slide wire 44 is effectively connected directly to the secondary winding 43. As soon as an overspeed condition exists, the slider 50 is moved toward the left by an amount proportional to the amount of the overspeed. The movement of this slider 50 toward the left decreases the amount of voltage across the slide wire 44 and also shifts the balance voltage of the electrical network in a pressure decreasing direction, or in a waste gate opening direction. With the decreased amount of voltage across the slide wire resistor 44, it can be seen that the controlling effect of the pressure sensitive device will be decreased and to accomplish the same amount of voltage movement of the arm 45 on the slide wire 44 will require a much larger displacement of the arm 45 by the bellows 46. In other words, to maintain the same balance that was present in the system before the overspeed, the pressure will have to drop and reposition arm 45 to regain balance in the system and the amount the arm 45 will have to be moved will depend on the decreased voltage due to the overspeed condition and the unbalance due to the overspeed condition. If the slider 50 were moved to its extreme left hand position, as would occur with a maximum overspeed condition, it can be seen that the controlling effect of the pressure sensitive device would be eliminated and the amount of unbalance across the upper portion of network 49 due to the slider 50 being in the extreme left hand position would be equal to approximately one half the voltage across the secondary 43. With such an unbalance signal across the electrical network, the amplifier would cause the waste gate motor to move the waste gate to full open position to eliminate the overspeed condition.

A close analysis of this circuit will show how the apparatus actually functions. When there is no overspeed condition and the slider 50 is biased in its right hand position the voltage applied to the slide wire resistor 44 is the full voltage of the secondary 43 since the slide wires 49 and 44 are connected in parallel. When there is a pressure change in the conduit 17, the pressure sensitive bellows will move the slider 45 an amount proportional to the change in pressure. Under normal conditions, a unit change in pressure will result in a certain amount of voltage being introduced into the network by the movement of the slider 45 and this voltage will be a function of the total voltage applied to the slide wire 44. Obviously, if the voltage across the slide wire 44 is decreased, the unit change in pressure will result in a smaller amount of voltage unbalance in the system. Thus, when the overspeed condition occurs, the slider 50 moving toward the left decreases the voltage applied to the slide wire 44 so that a unit change in pressure and the resultant movement of the slider 45 introduces a voltage in the network that is less than that voltage that was introduced when full voltage was across the network. From this it can be seen that the movement of the slider 50 decreases the controlling effect of the pressure sensitive device by an amount proportional to the magnitude of the overspeed condition. In other words, the ratio between movement of slider 45 and the resultant voltage induced in the network has been changed by an amount proportional to the magnitude of the limiting condition or the movement of slider 50.

Movement of the slider 50 to the left has a further function and that is to shift the balanced point of the network in a pressure limiting direction. This will be readily apparent when it is assumed that an overspeed condition exists and the slider 50 is displaced from the right hand terminal by an amount that is proportional to the magnitude of the overspeed condition. When such is the case, there is a certain amount of resistance added to the right hand circuit of the slide wire 44. This added resistance will consist of the resistance of the slide wire 49 to the right of the displaced slider 50 connected in parallel with the resistance 39. The effect of this added resistance is to shift the control point of the slide wire 44 to the right or in a pressure decreasing direction. The amount of this shift will be determined by the amount of the resistance added due to the movement of the slider 50 to the left. From this it can be seen that the control point of the network is shifted in a pressure limiting direction by an amount proportional to the magnitude of the overspeed condition.

As soon as the overspeed condition has been eliminated, the slider 50 will move back to the extreme right hand position, where it is normally biased, and the system will operate with the pressure sensitive device having its full amount of control. In an actual installation, the overspeed governor is designed to have a differential between the action of overspeed and drop out which results in a narrow range of "no action" and which results in greater stability in the operation of the apparatus.

In the event, that during normal operation or upon an overspeed, the tap 50 should open circuit with its associated slide wire 49, the apparatus will be unbalanced in a direction to cause a pressure limiting or a waste gate opening bias signal to exist across the input terminals of the amplifier 56. This will be evident since the resistor 39 is connected between the slider 50 and the right hand terminal of the slide wire 49. Assume the slider 50 is not engaging the slide wire 49, it can be seen that there is a circuit completed to the slide wire 44 through the resistor 39. This circuit may be placed from the positive terminal of the secondary 43 through the conductor 76, resistor 39, slide wire 44, and conductor 75 back to the negative terminal of the secondary winding 43. The balance point of the electrical network will be shifted an amount that is determined by the sizes of the slide wire 44 and the resistor 39. The unbalance voltage due to this added resistance is generally sufficient to move the waste gate to a position far enough open to eliminate any dangers from the existance of an overspeed condition or excessive input pressure. The provision of the resistor 39 between the slider 50 and the right hand terminal of the slide wire 49 is merely for safety purposes and normally provides no function in the control circuit.

From the foregoing, it can be seen that a pressure control apparatus has been provided where normally a pressure sensitive device is in direct control of the system and upon the occurrence of a condition to be limited, the controlling effect of the pressure sensitive device is decreased by an amount proportional to the magnitude of the condition to be limited. Further, a control system having an electrical network has been provided, which, upon the occurrence of a condition to be limited, not only decreases the sensitivity of the pressure sensitive control but shifts the controlling effect of the network in a condition limiting direction by an amount proportional to the magnitude of the condition to be limited.

Although I have described my invention in connection with a pressure control system for an internal combustion engine, and while it is particularly well adapted for use there, it will be obvious to those skilled in the art that my invention could be applied to any apparatus wherein it is necessary to provide a limiting function in connection with a control network. Therefore, I intend to be limited solely by the scope of the appended claims in which I claim:

1. In combination, a balanceable electrical bridge network, one portion of which comprises a first and second impedance each having a variable tap, means interconnecting said impedances so that one end of the first of said impedances is connected to one end of the second of said impedances and the tap of said first impedance is connected to the other end of said second impedance, condition sensing means, condition control means, means connecting said condition sensing means to the tap of said second impedance to variably adjust the tap according to variations in a condition, means connecting said condition control means to the output portion of said bridge so that said condition control means is operable according to the unbalance of said bridge network, limit control means connected to the tap of said first impedance operable upon the occurrence of a condition to be limited to bias the tap toward the end which is connected to said second impedance, a third impedance connected between the tap of said first impedance and the end of said first impedance not connected to said second impedance, said third impedance being operable upon the tap of said first impedance becoming disconnected from said first impedance to change the balance of said bridge in a condition limiting direction.

2. In a pressure control apparatus for an engine having a combustion chamber, pressure sensing means, manual control means, limit control means automatically operative upon the occurrence of a condition requiring limiting, regulating means, a balanceable bridge network, one portion of which comprises first and second potentiometers having end terminals and wipers, means interconnecting said potentiometers so that one end of said first is connected to one end of said second and the wiper of said first is connected to the other end of said second, means connecting said pressure sensing means to the wiper of said second potentiometer, means connecting the wiper of said first potentiometer to said limit control means, said last mentioned wiper being normally biased to the end opposite the end connection common to said first and second potentiometers so that movement of the wiper on said second potentiometer has full control of that portion of said bridge only in the absence of a limit condition, means connecting said manual control means to a further portion of said network, and follow up means connected to a still further portion of said bridge network and said regulating means and operable upon an unbalance of said bridge to rebalance said bridge and adjust said regulating means in a pressure maintaining sense when said bridge is unbalanced by said manual control means or said pressure sensing means and in a pressure limiting sense when said bridge is unbalanced by said limit control means.

3. In a pressure control apparatus for an internal combustion engine, pressure sensing means, manual control means, limit control means automatically operative upon the occurrence of a condition requiring limiting, regulating means, a balanceable bridge network, one portion of which comprises first and second potentiometers having end terminals and wipers, means interconnecting said potentiometers so that one end of said first is connected to one end of said second and the wiper of said first is connected to the other end of said second, means connecting said pressure sensing means to the wiper of said second potentiometer, means connecting the wiper of said first potentiometer to said limit control means, said last mentioned wiper being normally biased to the end opposite the end connection common to said first and second potentiometers so that movement of the wiper on said second potentiometer has full control of that portion of said bridge only in the absence of a limit condition, means connecting said manual control means to a further portion of said network, follow up means connected to a still further portion of said bridge and said regulating means and operable upon an unbalance of said bridge to rebalance said bridge, and an impedance connected between the wiper of said first potentiometer and the end of said first potentiometer to which the wiper of said first potentiometer is biased and operable to unbalance said bridge in a pressure limiting sense when the wiper of said first potentiometer becomes separated from said first potentiometer.

4. Control apparatus for a motor adapted to position a condition controlling device, comprising: a motor; motor controlling means therefor adapted to control the operation of said motor in accordance with the voltage applied thereto; a balanceable electrical network, said network comprising three voltage selecting devices, each having input and output terminals and an adjustable member and effective when the input terminals are connected to a source of voltage to cause a voltage to appear across the output terminals of a magnitude dependent upon the position of said adjustable member; means responsive to an abnormal limiting condition for adjusting the adjustable member of a first of said voltage selecting devices to produce a limiting effect; means responsive to a normal condition for adjusting the adjustable member of a second of said devices to produce a normal controlling effect and operative when said condition has the desired value to maintain the output voltage of said second device at an intermediate value; means connecting said motor to the adjusting member of a third of said devices to produce a follow-up effect; means for applying a voltage to the input terminals of said first and said third devices; means for connecting the output terminals of said first device to the input terminals of said second device so that the voltage across the output terminals of said second device is dependent upon the positions of the adjusting members of both the first and second devices, said means responsive to a limiting condition normally maintaining the adjusting member of said first device in its maximum voltage output position but being operative upon said limiting condition assuming an undesired value to move said adjusting member of said first device in a direction to reduce the output of said first device and hence the effect and output of said second device so as to unbalance said network; and means electrically connecting said motor controlling means and the output terminals of said second and third devices in such a manner that the voltage applied to said motor controlling means is dependent up the algebraic sum of the voltages across the output terminals of said second and third devices and such that said unbalance of said network resulting from the limiting condition assuming an undesired value causes the motor to move in a direction such that the limiting condition tends to be so affected by the condition controlling device as to no longer assume the undesired value.

5. Control apparatus for a motor adapted to position a condition controlling device, comprising: a balanceable electrical network, said network comprising first and second potentiometers each of which comprises relatively movable impedance and tap members, said impedance members each having opposite end terminals; a source of voltage; means connecting the opposite terminals of the impedance member of said first potentiometer to said source of voltage so that there exists between a first of the end terminals of said impedance member and the tap member associated therewith a voltage the magnitude of which is dependent upon the relative positions of said impedance member and said tap member, means connecting the impedance member of said second potentiometer between said first end terminal and tap member of said first potentiometer, means responsive to a normally controlling condition connected to one of said members of said second potentiometer for adjusting the relative position of said tap and impedance members and operative when said condition has the desired value to maintain them substantially centered with respect to each other; means responsive to a limiting condition connected to one of said members of said first potentiometer for adjusting the relative positions of said impedance and tap members of said first potentiometer, said limiting condition responsive means normally being effective to maintain said tap member adjacent the end terminal opposite to said first end terminal but upon said limiting condition assuming an undesired value being effective to cause said tap to approach said first terminal to reduce the voltage applied to said impedance member of said second potentiometer to reduce the effect of said means responsive to the normally controlling condition and to unbalance said network; a motor, motor controlling means therefor adapted to control the operation of said motor in accordance with the voltage applied thereto, a follow-up voltage controller operatively positioned by said motor and electrically connected to said second potentiometer; and means electrically connecting said motor controlling means to the tap member and one end terminal of said second potentiometer and to said follow-up voltage controller so that the voltage applied to said motor controlling means is dependent upon both said second potentiometer and said follow-up voltage controller, said electrical connections being of such electrical sense that said unbalance of the network resulting from the limiting condition assuming an undesired value causes the motor to move in a direction such that the limiting condition tends to be so affected by the condition controlling device as to no longer assume an undesired value.

ALEX B. CHUDYK.

REFERENCES CITED

The following references are of record in the file of this patent:

UNITED STATES PATENTS

| Number | Name | Date |
|---|---|---|
| 1,586,233 | Anschutz-Kaempfe | May 25, 1926 |
| 2,115,834 | Young | May 3, 1938 |
| 2,317,807 | Ryder | Apr. 27, 1943 |
| 2,325,232 | Davis | July 27, 1943 |
| 2,336,492 | MacKay | Dec. 14, 1943 |
| 2,363,690 | Razek | Nov. 28, 1944 |
| 2,376,143 | Edwards et al. | May 15, 1945 |
| 2,387,795 | Isserstedt | Oct. 30, 1945 |
| 2,388,350 | Taylor | Nov. 6, 1945 |
| 2,410,651 | Glass | Nov. 5, 1946 |
| 2,422,162 | Borell | June 10, 1947 |
| 2,423,417 | Stokes et al. | July 1, 1947 |
| 2,423,534 | Upton | July 8, 1947 |
| 2,433,326 | Sparrow | Dec. 23, 1947 |
| 2,462,097 | Heinz et al. | Feb. 22, 1949 |
| 2,477,668 | Sparrow | Aug. 2, 1949 |

FOREIGN PATENTS

| Number | Country | Date |
|---|---|---|
| 473,335 | Germany | Mar. 15, 1929 |